(12) United States Patent
Jensen (10) Patent No.: US 10,255,065 B1
(45) Date of Patent: Apr. 9, 2019

(54) AUTOMATICALLY BUILDING SOFTWARE PROJECTS

(71) Applicant: SEMMLE LIMITED, Oxford (GB)

(72) Inventor: Jonas B. Jensen, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/857,967

(22) Filed: Dec. 29, 2017

(51) Int. Cl.
  *G06F 9/44* (2018.01)
  *G06F 8/71* (2018.01)
  *G06F 8/36* (2018.01)
  *G06F 8/77* (2018.01)

(52) U.S. Cl.
  CPC .............. *G06F 8/71* (2013.01); *G06F 8/36* (2013.01); *G06F 8/77* (2013.01)

(58) Field of Classification Search
  CPC ...................................... G06F 8/30; G06F 8/33
  USPC ......................................................... 717/101
  See application file for complete search history.

(56) References Cited

U.S. PATENT DOCUMENTS

| | | | | |
|---|---|---|---|---|
| 7,490,322 B2* | 2/2009 | Pichetti | ................... | G06F 8/658 717/170 |
| 7,694,181 B2* | 4/2010 | Noller | .................. | G06F 11/3688 714/38.11 |
| 2007/0234293 A1* | 10/2007 | Noller | ................. | G06F 11/3688 717/124 |
| 2012/0254824 A1* | 10/2012 | Bansod | ...................... | G06F 8/71 717/101 |
| 2014/0365825 A1* | 12/2014 | Hooks | ................. | G06F 11/0748 714/20 |
| 2015/0321103 A1* | 11/2015 | Barnett | ................. | G06T 19/006 345/419 |
| 2017/0372247 A1* | 12/2017 | Tauber | ...................... | G06F 8/30 |
| 2018/0081665 A1* | 3/2018 | Zhang | ...................... | G06F 8/63 |

\* cited by examiner

*Primary Examiner* — John Q Chavis
(74) *Attorney, Agent, or Firm* — Fish & Richardson P.C.

(57) ABSTRACT

Methods, systems, and apparatus, including computer programs encoded on computer storage media, for performing automatic builds of snapshots using software packages with highly similar contents. One of the methods includes computing, by a source code analysis system, a respective similarity score between contents of a particular snapshot and contents of each software package of a plurality of software packages in one or more package repositories. A highest-scoring software package for the snapshot is determined using the computed similarity scores. An automatic build of the snapshot using the highest-scoring software package is performed, including identifying one or more dependencies and one or more build commands from the highest-scoring software package, installing the one or more dependencies in a build environment of the snapshot, and executing the one or more build commands in the build environment of the snapshot.

20 Claims, 3 Drawing Sheets

AUTOMATICALLY BUILDING SOFTWARE PROJECTS

BACKGROUND

This specification relates to static analysis of computer software source code. Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot is a representation of the source code of the code base as the source code existed at a particular point in time. A snapshot may be thought of as including all the source code as of a particular point in time, although all the source code need not be explicitly stored for every snapshot.

Static analysis results can be used for a variety of practical applications, which include attributing source code contributions and generating data that characterizes large scale trends in code bases. Attributing source code contributions means attributing changes introduced by a snapshot to a particular developer entity responsible for committing the snapshot. A developer entity can be a single developer or a group of multiple developers. Each developer is typically a human, although a developer can also be a software program, e.g., a "robot," that writes source code. For example, a developer entity can be a lone developer, developers on a team, developers within a department of an organization, or any other appropriate group of developers. Static analysis systems can compute sophisticated metrics of source code contributions and present visualizations of such information. For example, a static analysis system can generate a lines-of-code graph that illustrates net lines of code contributed to a code base during a particular time period.

Source code in a code base is typically compiled in a build environment by a build system. The build environment can include an operating system; a file system; executable files, e.g., build scripts and utilities, interpreters, compilers, and source code generators; environment variables, e.g., variables that indicate a path to file system directories that contain source code files or executable files; and other configuration files for building source code in the code base.

Accurate source code analysis of source code in a software project often requires a static analysis system to instrument a build system used to build the software project. Instrumenting the build system allows the static analysis system to perform an instrumented build of the software project, during which the static analysis system can trace the build process by intercepting calls by the build system to compilers.

There are a variety of reasons that performing an instrumented build for a software project can result in more accurate analysis of source code in the project. As one example, tracing a build process allows the static analysis system to identify precisely the source code that is built for the software project without having to emulate the actions of the build system. A variety of build system mechanisms make this information difficult to obtain without tracing the build. For example, build system preprocessors can make arbitrary textual substitutions in existing source code files before a compiler is called. Preprocessors can also generate temporary source code files that are compiled and then deleted by the build system when compilation is complete. In addition, some build utilities, e.g., the "make" utility on Linux and Unix operating systems, can be programmed to copy source code files from one place to another during the build process. For example, a build utility can copy a file from one location to another for compilation because another source code file may include or depend on the copied file. The copied file may then be deleted by the build system after compilation is complete. Furthermore, source code generators can generate source code at build time that does not exist before the build process is started. In all of these situations, merely having read access to the source code files in a file system is insufficient for a static analysis system to extract all the source code that is actually built by a build system.

While performing instrumented builds for software projects can result in more accurate analysis of source code, the need to actually perform the build is a scalability bottleneck for large-scale static analysis systems. This is mostly because some manual configuration and labor is usually required to set up the build environment, identify build commands, and launch build scripts. Project documentation may specify, in a human-readable way, what dependencies and build commands are required. However, automatically analyzing and understanding such natural language instructions is not feasible with current NLP technology. Such manual configurations are unsuitable for a static analysis system that seeks to build thousands or tens of thousands of software projects automatically.

This bottleneck becomes worse for static analysis systems that perform analysis by comparing multiple snapshots within a single project, e.g., to attribute the introduction and removal of source code defects. In these cases, the static analysis system needs to perform instrumented builds for many, possibly thousands, of individual snapshots of each single software project. Manually configuring all of these builds across thousands of software projects is simply not feasible for a scalable static analysis system.

SUMMARY

This specification describes how a source code analysis system can automatically build software projects by automatically configuring a build environment and automatically identifying and executing build commands. To do so, a system can take advantage of the fact that a lot of knowledge about how software projects are built is encoded in machine-readable public packaging archives. The system can compute the similarity between the snapshot to be built and packages found in public archives, and it can apply the build instructions from the most similar package(s) found. This enables the system to perform automatic, unsupervised builds of software projects.

Particular embodiments of the subject matter described in this specification can be implemented so as to realize one or more of the following advantages. A source code analysis system can perform automatic instrumented builds of many, possibly thousands or tens of thousands, of software projects without human intervention. This allows the source code analysis system to automatically analyze much more source code than would otherwise be possible. The system can also benefit from expert human labour and skill automatically. For example, when newer software versions need to be built in newer environments, problems may come up that require true ingenuity to solve. The techniques described in this specification allow a system to automatically stay up to date with how people are solving these real-world problems. This also paves the way for a system to provide large-scale, automatic, distributed analysis of tens of thousands of code bases.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can automatically build snapshots of a software project by using package repositories. Often, the package repositories are publically available package repositories.

In this specification, a package is a collection of data that specifies how to build a particular snapshot of a software project. A package primarily specifies three kinds of information to build a snapshot: source code files to be built, required dependencies, and build commands. A package for a particular software project may also include other information, although such other information may not be relevant to the techniques described in this specification.

A package specifies source code files to be built. A package can specify a filename for each source code file and optionally, a version for the source code file. A package may or may not actually include the source code files themselves. For example, a package can specify a location from which the source code files can be obtained, e.g., a location in a file system or a network location, e.g., a location on the Internet.

A package also specifies dependencies that are required to be installed in order for a build to be successful. A dependency has a name, and optionally a version and a location. A dependency is typically itself another package, although a dependency may also simply be an executable file or a library file. For example, the package can specify, as required dependencies, packages having certain executable files to be installed, e.g., compilers or linkers; libraries to be installed; and header files that must be present, to name just a few examples. A dependency can be in source form or in binary form. When a dependency is in source form, the system can invoke a build process in order to compile the dependency. In addition, dependencies themselves can also have other dependencies. Thus, building a particular dependency can involve recursively compiling other dependencies on which the particular dependency depends.

A package also specifies build commands that are used to build the snapshot. The package can also optionally specify the order in which the build commands should be executed. A package typically specifies the dependencies and build commands in a machine-readable way so that a computer program can unambiguously interpret the required dependencies and build commands. Thus, packages can be specified in a particular standardized format that is machine-readable.

A repository is a collection of one or more packages. Often, package repositories are hosted on publically available networks, e.g., the Internet. A package repository system is a system that provides access to such package repositories.

Figure 1:
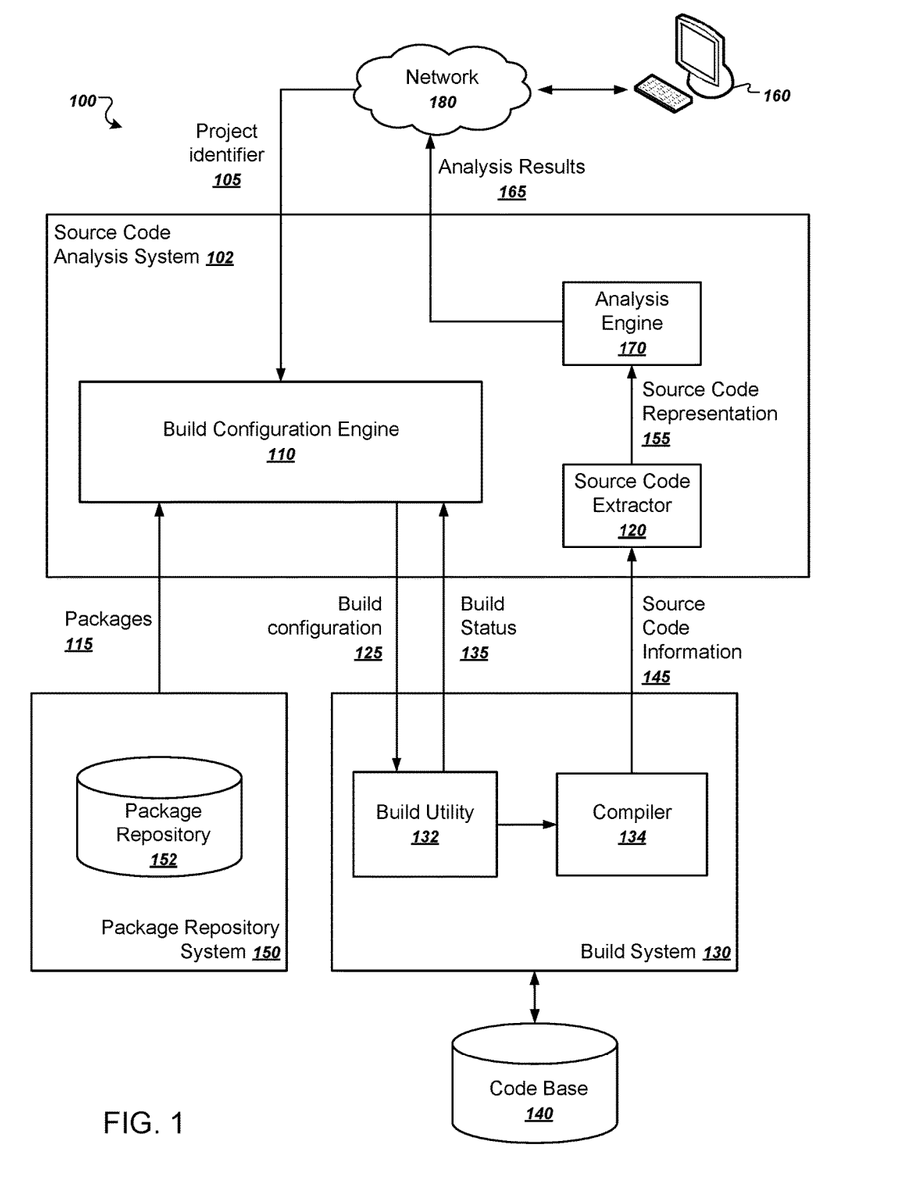
FIG. 1 is a diagram that illustrates an example system.

FIG. 1 is a diagram that illustrates an example system 100. The system 100 includes a user device 160 in communication with a source code analysis system 102 over a network 180, which can be any appropriate communications network. The system 100 is an example of a system in which a source code analysis system 102 automatically builds one or more snapshots of a software project in order to extract and analyze source code of the software project.

The source code analysis system 102 includes a build configuration engine 110, a source code extractor 120, and an analysis engine 170. The components of the source code analysis system 102 can be implemented as computer programs installed on one or more computers in one or more locations that are coupled to each other through a network. Alternatively, the source code analysis system 102 can be installed in whole or in part on a single computing device, e.g., the user device 160.

The source code analysis system 102 can communication with a package repository system 150. The package repository system 150 provides one or more packages 115 that each specify how to build a particular snapshot of a particular software project. The package repository can be any appropriate repository that provides access to software packages, e.g., the Debian package repository.

The source code analysis system 102 is also in communication with a build system 130. The build system 130 can be installed on a single computer or on multiple computers. For example, the build system 130 can be a distributed build system including thousands of computers that cooperate to build code in a code base in parallel. The source code analysis system 102 and the build system 130 can be installed on different computing devices that are in communication with one another, e.g., using the network 180, or the source code analysis system 102 and the build system 130 can be installed on a same computing device.

The build system 130 builds source code, e.g., using a build utility 132 and one or more compilers 134, which can be conventional components for building and compiling source code. For example, the build system 130 can use the "make" utility for Linux and Unix systems or a batch script that coordinates compiling of source code in the code base 140.

A user of the user device 160 can provide a project identifier 105 of a software project to the build configuration engine 110 of the source code analysis system 102. The project identifier 105 is part of an explicit or implicit request to automatically build snapshots of the software project. For each snapshot, the source code analysis system can perform an instrumented build in order to extract precisely the source code that the compiler 134 of the build system 130 is compiling.

The build configuration engine 110 can communicate with the package repository system 150 in order to determine how to automatically build snapshots of the software project. The build configuration engine 110 can receive one or more packages 115 from the package repository, which can occur before or after the request to build the software project is received. The build configuration engine 110 can then determine how to automatically build the software project using the received one or more packages 115. This process is described in more detail below with reference to FIGS. 2-3.

The build configuration engine 110 can attempt a build with a particular build configuration 125. To do so, the build configuration engine 110 can provide a build configuration 125 to the build system 130. The build configuration 125 can modify the build system 130 to set up an attempted build of a particular snapshot of the software project. For example, the build utility 132, the compiler 134, or both, can be specified by a particular build configuration 125. If components specified by the build configuration 125 are not installed in the build system 130, the build configuration engine 110 can modify the build system 130 to install these components before attempting a build.

As part of this process, the build configuration 125 can specify downloading or retrieving the snapshot to be built from a code base 140. The build configuration 125 can then cause the build system 130 to run one or more build commands to attempt a build of the snapshot in the code base 140 using the build utility 132.

For each attempted build, the source code analysis system 102 can instrument the build system 130, which causes the build system 130 to provide source code file information 145 to the source code extractor 120 whenever a source code file is compiled by the build system 130. The source code file information 145 generally specifies the location of a source code file or the source code itself contained in the source code file. Suitable techniques for instrumenting a build system are described in more detail in U.S. Pat. Nos. 9,110,737 and 9,489,182, which are herein incorporated by reference in their entirety. Regardless of the specific instrumentation technique that is used, the source code extractor 120 uses the source code file information 145 to access precisely the source code that will be compiled by the compiler 134.

If a build fails, the build utility 132 can provide a build status 135 back to the build configuration engine 110. The build configuration engine 110 can then generate a different build configuration 125 and attempt another build with the different build configuration 125.

During a successful build process, the source code extractor 120 can generate a representation 155 of the extracted source code to an analysis engine 170. For example, the source code representation 155 can be a parsed representation of the source code that has been fully or partially analyzed semantically according to rules of the underlying programming language.

The analysis engine 170 can generate various source code metrics from the extracted source code 155, which can be reported back to the user device 160 as analysis results 165. The analysis results 165 can represent any appropriate static analysis results, e.g., source code defects, attributions of source code contributions including defect introductions and removals, values of various source code metrics, and visual representations of large scale trends in the code base 140.

Figure 2:
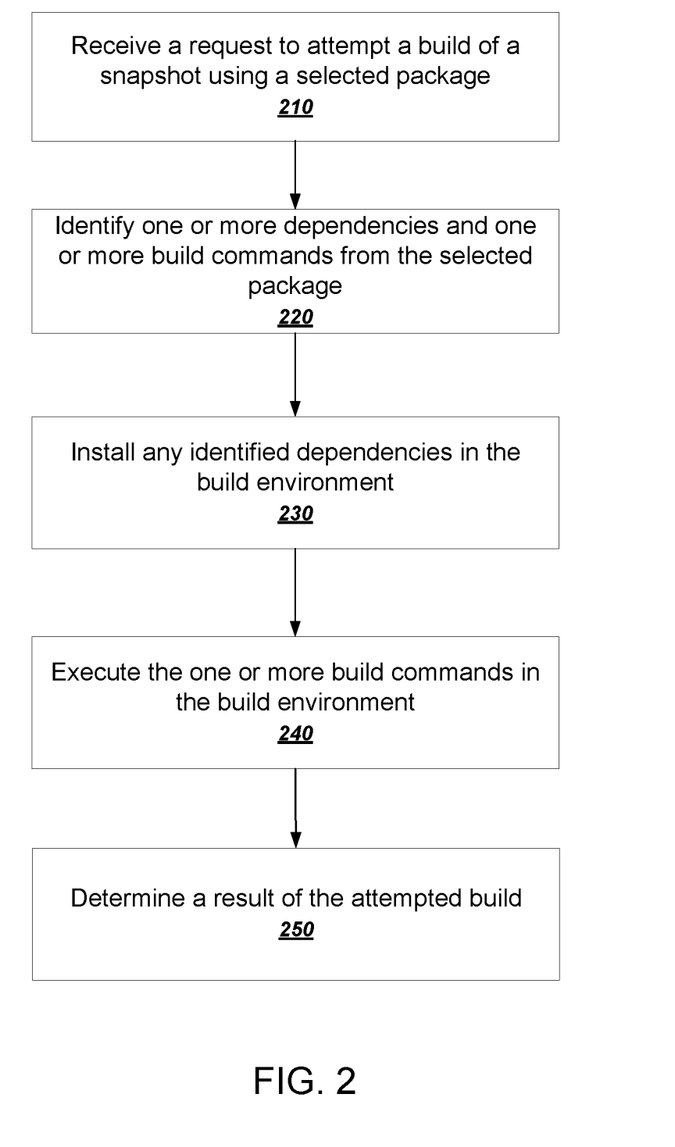
FIG. 2 is a flowchart of an example process for attempting a build using a selected package.

FIG. 2 is a flowchart of an example process for attempting a build using a selected package. In general, a system identifies one or more dependencies and one or more build commands from a selected package. The system can then attempt the build by installing the identified dependencies, running the identified build commands, and determining whether the build succeeded. For convenience, the process will be described as being performed by a system of one or more computers, located in one or more locations, and programmed appropriately in accordance with this specification. For example, a build configuration engine, e.g., the build configuration engine 110 FIG. 1, appropriately programmed, can perform the example process.

The system receives a request to attempt a build of a snapshot using a selected package (210). As described above, the request can be part of a request to perform static analysis on source code by performing an instrumented build of one or more snapshots of a software project.

The request can specify a package obtained from a package repository. Importantly, the package need not actually match the snapshot being built. In many instances, the package will have been generated for a different snapshot of the same software project, which can be a snapshot that is older or newer than the current snapshot. In addition, because of common practices in how software projects are packaged, the selected package need not have any relation at all to the snapshot being built.

The process of actually selecting a package from which to attempt a build for a particular snapshot is described in more detail below with reference to FIG. 3.

The system identifies one or more dependencies and one or more build commands from the selected package (220). The dependencies and build commands in a package can be specified in a machine-readable format. In some implementations, the system uses only packages that are generated for a same computing platform as the snapshot.

In some cases, the name of the dependency is not unique among a collection of available dependencies. This means that multiple available dependency packages may satisfy the dependency for the project. When faced with this issue, a conventional package management system that isn't fully automatic may be designed to prompt for user input to resolve the ambiguity. However, this approach is generally unsuitable for a fully automated build system.

Instead, the system can resolve the ambiguity by applying one or more heuristics. For example, the system can maintain or obtain statistics about the respective popularity of packages or the respective frequency at which packages are installed. The statistics can be computed from external information about the packages, or the statistics can be computed from internal information about packages that are installed on the source code analysis system. The system can then rank the multiple available dependency packages and select a highest-ranked dependency package.

Alternatively or in addition, the system can iteratively attempt the build with each of the multiple available dependency packages. In some implementations, the system attempts the build according to the ranking of the multiple available dependency packages until one of the packages results in a successful build. This is described in more detail below with reference to FIG. 3.

The system installs any identified dependencies in the build environment (230). Each dependency can be a named software module with a specified version or version range. In some cases, the system may need to retrieve the named software modules from other public repositories. The system can install the dependencies directly or delegate the installation task to a package manager.

The system executes the one or more build commands in the build environment (240). After installing the dependencies, the system can run the build commands, which are typically specified in a particular sequence.

The system determines a result of the attempted build (250). If the build failed or reported errors, the system can determine that the attempted build was a failure. If the build returned no errors or fewer than a threshold number of errors, the system can determine that the attempted build was a success.

Success or failure of a build need not be measured in the same way as for an actual software build. In many instances, partial success is good enough to generate sufficiently accurate analysis results. Thus, in some implementations, success or failure is determined by the amount of source code extracted during an instrumented build. For example, if at least a threshold number of lines of source code of the snapshot were extracted during the instrumented build, the system can designate the build as a success, even if errors were encountered during the build process.

In addition, because a source code analysis system typically builds many snapshots of a particular software project, the system need not determine success or failure of any one snapshot in total isolation. Rather, the system can determine how the snapshot compared to its neighbors in a revision graph of the project. For example, if an instrumented build of a snapshot extracted at least a threshold number of lines of source code as a neighboring snapshot in the revision graph, the system can designate the build process as a success, even if the total number of lines of source code extracted was less than 100%. Similarly, the system can compute statistics about lines of code extracted by other snapshots in the neighborhood of the snapshot in the revision graph and use such statistics to gauge the success or failure of the attempted build.

Figure 3:
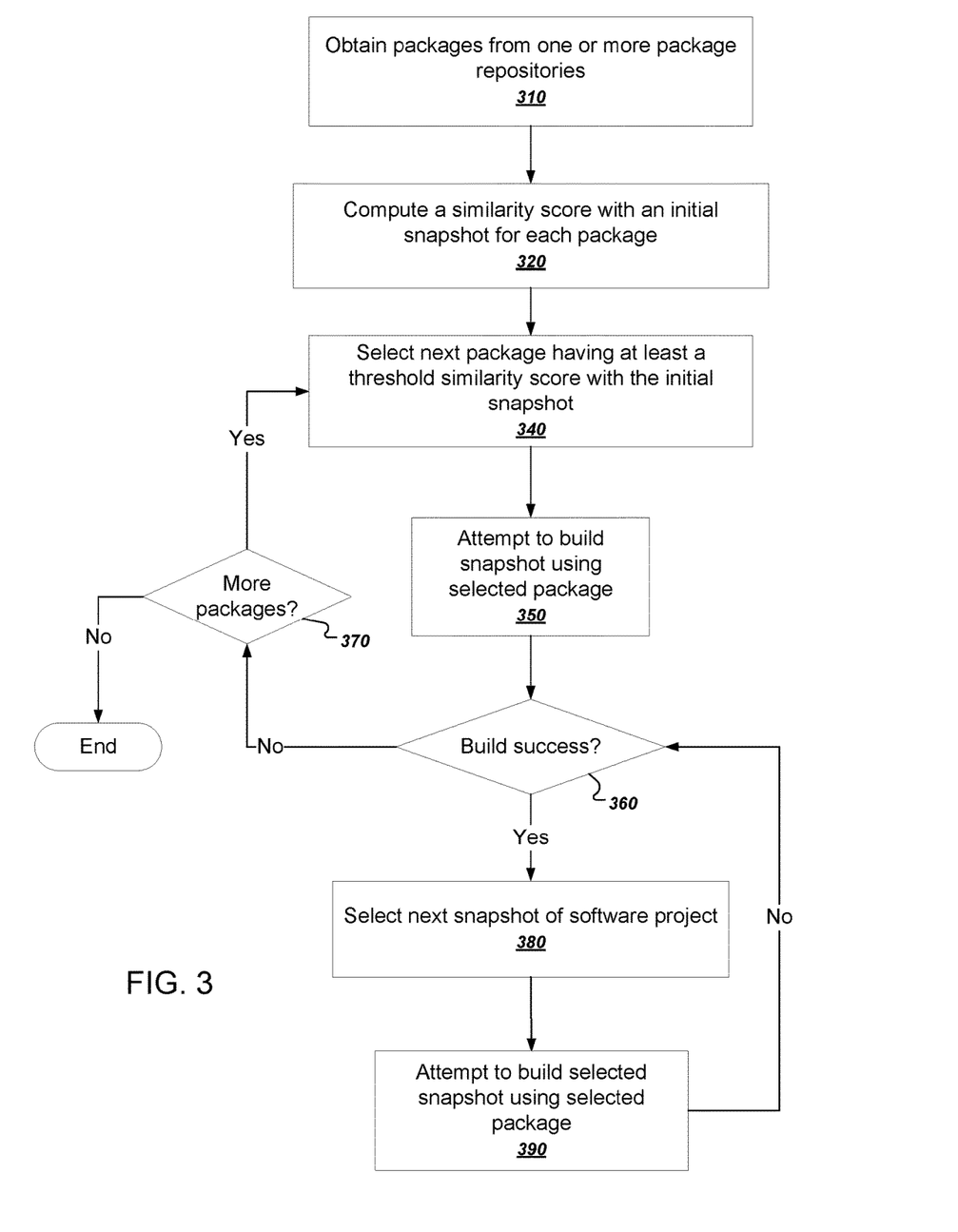
FIG. 3 is a flowchart of an example process for selecting a package for building a snapshot.

FIG. 3 is a flowchart of an example process for selecting a package for building a snapshot. For convenience, the process will be described as being performed by a system of one or more computers, located in one or more locations, and programmed appropriately in accordance with this specification. For example, a build configuration engine, e.g., the build configuration engine 110 FIG. 1, appropriately programmed, can perform the example process.

The system obtains packages from one or more package repositories (310). As described above, the system can obtain any number of packages from publically available package repositories.

The packages that are available at any point in time will usually include a package for the most recent stable snapshot of a software project. Packages for older or deprecated snapshots may or may not be available.

The system computes a similarity score with an initial snapshot for each package (320). The initial snapshot can be any appropriate starting point for building multiple snapshots of the project. Thus, after finding a package that results in a successful build, the system can apply the configuration of the package to multiple other snapshots in the software project. Because package repositories tend to maintain packages for the most recent snapshots of packages, the system can choose the initial snapshot to also be a most recent snapshot of the project, or a snapshot within a recent time period, e.g., committed during the previous week, month, or year.

The system can compute a similarity score as a measure of similarity between contents of the initial snapshot and contents of the package. For example, the system can compute a measure of similarity between the file text of files in the package and files in the snapshot. In some implementations, the system compares file text only for corresponding files having a same or similar location within the snapshot or package.

In some other implementations, the system can compute a measure of similarity between corresponding content identifiers occurring in the snapshot and the package. A content identifier is any appropriate name of a source code element in a package or a snapshot. For example, a content identifier can be a filename, a variable name, a function name, or a class name, to name just a few examples. In general, the similarity score increases when there are more content identifiers that overlap, and the similarity score decreases where there are fewer content identifiers that overlap.

In some implementations, the system ignores or strips away one or more layers of directory names when computing similarity scores. This can result in high similarity scores even if some content, e.g., files, were moved in the package or the snapshot.

The system can use any appropriate technique to compute a similarity score between the filenames. In general, the system increases the score for each matching filename between the initial snapshot and the selected package.

In some implementations, the system computes the similarity score as the Jaccard index between the content identifiers, which can be computed as the intersection of the content identifiers divided by the union of the content identifiers. In other words, the system can divide how many matching content identifiers there are by the total number of unique content identifiers in the snapshot and the package.

The system selects a next package having at least a threshold similarity score with the initial snapshot (340). After computing a similarity score for each package, the system can rank the packages by the computed similarity scores. The system can then iterate through the ranked list, attempt a build using each package in an order determined by the similarity scores. For example, the system can first select a highest-scoring package and attempt to build the snapshot using the highest-scoring package. If the attempted build fails, the system can select a next-highest-scoring package and attempt to build the snapshot using the next-highest-scoring package.

The system attempts to build the initial snapshot using the selected package (350). For example, the system can use the process described above with reference to FIG. 2.

The system determines if the build succeeded (360). As described above, the system can use different or customized definitions of success or failure of a build depending on the requirements of the system.

If the build did not succeed, the system determines if there are more packages to try (branch to 370). If so, the system selects a next package (branch to 340).

If the build did succeed (360), the system can try to build other snapshots in the software project using the same build configuration (branch to 380). Between snapshots in a revision graph, the actual dependencies and build commands tend to change very little. Therefore, there is a high likelihood that once a successful build configuration is found, the same build configuration can be applied to multiple other snapshots in the same neighborhood of the revision graph. Therefore, the system can, but need not, compute similarity scores between packages and snapshots for every snapshot in the revision graph. Rather, once a successful build configuration is found, the system can instead propagate that build configuration to other snapshots until the build configuration is no longer successful.

Thus, the system selects a next snapshot of the software project (380). The system can propagate the build configuration in any appropriate direction, e.g., forward in time, backward in time, or both.

The system attempts to build the selected snapshot using the selected package (390). In other words, the system attempts a build using the build configuration generated from the selected package.

If the build succeeds (360), the system can keep propagating the build configuration.

If a snapshot is encountered in which the build fails (360), the system can determine if there are more packages to consider for that snapshot (370). If so, the system can select a next package (branch to 340). Note that after propagating the build configuration across the revision graph, the system may need to recompute the similarity scores for the snapshot on which the build process failed.

If there are no more packages to consider (370), the process ends. The process can also end when all snapshots of the project have been successfully built.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving, by a source code analysis system, a request to automatically build a snapshot of a software project;
obtaining, by the source code analysis system, a plurality of software packages from one or more package repositories;
computing, by the source code analysis system, a respective similarity score between contents of the snapshot and contents of each software package of the plurality of software packages;
determining a highest-scoring software package for the snapshot using the computed similarity scores; and
attempting an automatic build of the snapshot using the highest-scoring software package, including:
identifying one or more dependencies and one or more build commands from the highest-scoring software package,
installing the one or more dependencies in a build environment of the snapshot, and
executing the one or more build commands in the build environment of the snapshot.

Embodiment 2 is the method of embodiment 1, further comprising:
determining that the automatic build of the snapshot failed;
in response, selecting a next highest-scoring software package from the plurality of software packages; and
attempting an automatic build of the snapshot using the next highest-scoring software package.

Embodiment 3 is the method of any one of embodiments 1-2, further comprising:
determining that the automatic build of the snapshot succeeded;
in response, selecting a next snapshot of the software project; and
attempting an automatic build of the next snapshot using the package that successfully built the snapshot most similar to the next snapshot.

Embodiment 4 is the method of any one of embodiments 1-3, further comprising:
determining that the automatic build of the next snapshot failed;
in response, computing, by the source code analysis system, a respective similarity score between contents of the next snapshot and contents of each software package of the plurality of software packages;
determining a highest-scoring software package for the next snapshot using the computed similarity scores; and
attempting an automatic build of the next snapshot using the highest-scoring software package for the next snapshot.

Embodiment 5 is the method of any one of embodiments 1-4, wherein the snapshot and the highest-scoring software package are from different versions of the software project.

Embodiment 6 is the method of embodiment 5, wherein the highest-scoring software package is a different version of the software project than the snapshot.

Embodiment 7 is the method of embodiment 6, wherein the highest-scoring software package is a newer version of the software project than the snapshot.

Embodiment 8 is the method of any one of embodiments 1-7, wherein the snapshot and the highest-scoring software package are from different software projects.

Embodiment 9 is the method of any one of embodiments 1-8, wherein computing, by the source code analysis system, a respective similarity score between filenames of the snapshot and filenames of each software package of the plurality of software packages comprises stripping one or more directory names from the filenames of the snapshot and from filenames of each software package.

Embodiment 10 is the method of any one of embodiments 1-9, further comprising:
extracting source code from the snapshot by intercepting build commands executed in the build environment of the snapshot; and
determining whether the automatic build succeeded by computing an amount of source code extracted from the snapshot.

Embodiment 11 is the method of embodiment 10, wherein computing an amount of source code extracted from the snapshot comprises computing the amount of source extracted relative to source code extracted during an automatic build of one or more neighboring snapshots in a revision graph of the software project.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving, by a source code analysis system, a request to automatically build a snapshot of a software project;
   obtaining, by the source code analysis system, a plurality of software packages from one or more package repositories;
   computing, by the source code analysis system, a respective similarity score between contents of the snapshot and contents of each software package of the plurality of software packages;
   determining a highest-scoring software package for the snapshot using the computed similarity scores; and
   attempting an automatic build of the snapshot using the highest-scoring software package, including:
      identifying one or more dependencies and one or more build commands from the highest-scoring software package,
      installing the one or more dependencies in a build environment of the snapshot, and
      executing the one or more build commands in the build environment of the snapshot.

2. The system of claim 1, wherein the operations further comprise:
   determining that the automatic build of the snapshot failed;
   in response, selecting a next highest-scoring software package from the plurality of software packages; and
   attempting an automatic build of the snapshot using the next highest-scoring software package.

3. The system of claim 1, wherein the operations further comprise:
   determining that the automatic build of the snapshot succeeded;
   in response, selecting a next snapshot of the software project; and
   attempting an automatic build of the next snapshot using the package that successfully built the snapshot most similar to the next snapshot.

4. The system of claim 1, wherein the operations further comprise:
   determining that the automatic build of the next snapshot failed;
   in response, computing, by the source code analysis system, a respective similarity score between contents of the next snapshot and contents of each software package of the plurality of software packages;
   determining a highest-scoring software package for the next snapshot using the computed similarity scores; and
   attempting an automatic build of the next snapshot using the highest-scoring software package for the next snapshot.

5. The system of claim 1, wherein the snapshot and the highest-scoring software package are from different versions of the software project.

6. The system of claim 5, wherein the highest-scoring software package is a different version of the software project than the snapshot.

7. The system of claim 6, wherein the highest-scoring software package is a newer version of the software project than the snapshot.

8. The system of claim 1, wherein the snapshot and the highest-scoring software package are from different software projects.

9. The system of claim 1, wherein computing, by the source code analysis system, a respective similarity score between filenames of the snapshot and filenames of each software package of the plurality of software packages comprises stripping one or more directory names from the filenames of the snapshot and from filenames of each software package.

10. The system of claim 1, wherein the operations further comprise:
    extracting source code from the snapshot by intercepting build commands executed in the build environment of the snapshot; and
    determining whether the automatic build succeeded by computing an amount of source code extracted from the snapshot.

11. The system of claim 10, wherein computing an amount of source code extracted from the snapshot comprises computing the amount of source extracted relative to source code extracted during an automatic build of one or more neighboring snapshots in a revision graph of the software project.

12. A computer-implemented method comprising:
    receiving, by a source code analysis system, a request to automatically build a snapshot of a software project;
    obtaining, by the source code analysis system, a plurality of software packages from one or more package repositories;

computing, by the source code analysis system, a respective similarity score between contents of the snapshot and contents of each software package of the plurality of software packages;

determining a highest-scoring software package for the snapshot using the computed similarity scores; and attempting an automatic build of the snapshot using the highest-scoring software package, including:
- identifying one or more dependencies and one or more build commands from the highest-scoring software package,
- installing the one or more dependencies in a build environment of the snapshot, and
- executing the one or more build commands in the build environment of the snapshot.

13. The method of claim 12, further comprising:

determining that the automatic build of the snapshot failed;

in response, selecting a next highest-scoring software package from the plurality of software packages; and attempting an automatic build of the snapshot using the next highest-scoring software package.

14. The method of claim 12, further comprising:

determining that the automatic build of the snapshot succeeded;

in response, selecting a next snapshot of the software project; and attempting an automatic build of the next snapshot using the package that successfully built the snapshot most similar to the next snapshot.

15. The method of claim 12, further comprising:

determining that the automatic build of the next snapshot failed;

in response, computing, by the source code analysis system, a respective similarity score between contents of the next snapshot and contents of each software package of the plurality of software packages;

determining a highest-scoring software package for the next snapshot using the computed similarity scores; and attempting an automatic build of the next snapshot using the highest-scoring software package for the next snapshot.

16. The method of claim 12, wherein the snapshot and the highest-scoring software package are from different versions of the software project.

17. The method of claim 16, wherein the highest-scoring software package is a different version of the software project than the snapshot.

18. The method of claim 17, wherein the highest-scoring software package is a newer version of the software project than the snapshot.

19. The method of claim 12, wherein the snapshot and the highest-scoring software package are from different software projects.

20. A computer program product, encoded on one or more non-transitory computer storage media, comprising instructions that when executed by one or more computers cause the one or more computers to perform operations comprising:

receiving, by a source code analysis system, a request to automatically build a snapshot of a software project;

obtaining, by the source code analysis system, a plurality of software packages from one or more package repositories;

computing, by the source code analysis system, a respective similarity score between contents of the snapshot and contents of each software package of the plurality of software packages;

determining a highest-scoring software package for the snapshot using the computed similarity scores; and attempting an automatic build of the snapshot using the highest-scoring software package, including:
- identifying one or more dependencies and one or more build commands from the highest-scoring software package,
- installing the one or more dependencies in a build environment of the snapshot, and
- executing the one or more build commands in the build environment of the snapshot.

\* \* \* \* \*